No. 614,940. Patented Nov. 29, 1898.
J. ELMGREN.
MINER'S DINNER PAIL.
(Application filed Dec. 20, 1897.)
(No Model.)

Witnesses:
Franck L. Ourand
Jos. L. Coombs

Inventor:
John Elmgren,
Louis Bagger & Co
Attorneys.

THE NORRIS PETERS CO., PHOTO-LITHO., WASHINGTON, D. C.

UNITED STATES PATENT OFFICE.

JOHN ELMGREN, OF STARKVILLE, COLORADO.

MINER'S DINNER-PAIL.

SPECIFICATION forming part of Letters Patent No. 614,940, dated November 29, 1898.

Application filed December 20, 1897. Serial No. 662,608. (No model.)

*To all whom it may concern:*

Be it known that I, JOHN ELMGREN, a citizen of the United States, and a resident of Starkville, in the county of Las Animas and State of Colorado, have invented certain new and useful Improvements in Miners' Dinner-Pails; and I do hereby declare that the following is a full, clear, and exact description of the invention, which will enable others skilled in the art to which it appertains to make and use the same, reference being had to the accompanying drawings, which form a part of this specification.

My invention relates to dinner-pails of that class or description which comprise two receptacles, one fitting within the other, and the inner receptacle provided with a cover, and is more especially designed for the use of miners.

The object of the invention is to provide improved means for holding or locking the cover, and also for holding the inner receptacle within the outer one, whereby the contents are prevented from spilling out should the pail upset, and also for preventing mine-rats from getting at the contents.

The invention consists in the novel construction and combination of parts hereinafter fully described and claimed.

Figure 1:
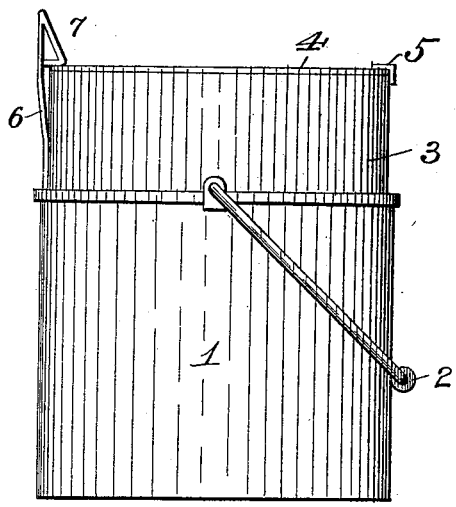
Figure 2:
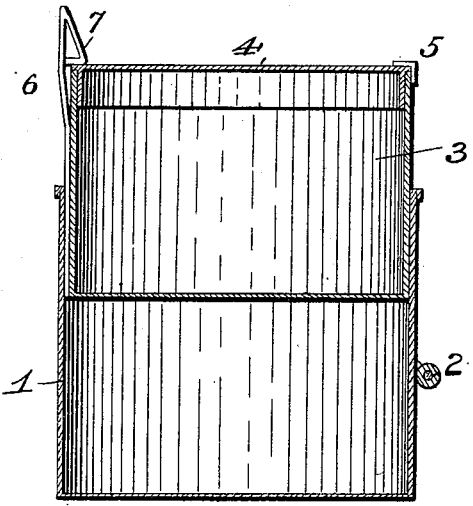

In the accompanying drawings, Figure 1 is a side elevation of a dinner-pail constructed in accordance with my invention. Fig. 2 is a central longitudinal section of the same.

In the said drawings the reference-numeral 1 designates a cylindrical receptacle provided with a bail or handle 2, which may be of any ordinary or suitable construction. This receptacle is designed more especially for holding solid food. Fitting within this receptacle is a similar receptacle 3 for holding liquid food or beverages and is somewhat smaller than receptacle 1, so as to fit snugly therein. This receptacle 3 extends only part way within receptacle 1 and is provided with a removable cover 4. At one side of the receptacle 3, at the upper edge, is an inwardly-extending lug 5, and diametrically opposite the same is a spring-catch 6, consisting of a spring-metal plate, one end of which is soldered or otherwise secured to the receptacle and the other end extended up above the top of the receptacle, and is then bent downwardly and inwardly, forming a spring-arm 7.

In practice the receptacle 3 is placed within the receptacle 1 and the cover 4 at one side inserted under the lug 5 and the other side then sprung down, so as to engage with the arm of the spring-catch. By this means the cover is held securely to the receptacle 3, so as to prevent disengagement therefrom under ordinary circumstances, and the receptacle 3 is also held in place in the receptacle 1, as shown. To lock the cover in the receptacle 3, the said receptacle is pushed downward into receptacle 1, so that the upper edge of the latter will engage with the outwardly-extending upper portion of the spring-arm, pushing it inwardly and locking the same and preventing the cover from being removed until the receptacle 3 has been withdrawn sufficiently to clear the said outwardly-extending portion of the spring-arm.

Having thus fully described my invention, what I claim is—

In a miner's dinner-pail, the combination with the outer receptacle provided with a bail, of the inner receptacle provided with a cover, the inwardly-extending lug secured to the upper edge of said inner receptacle and extending over the edge of the cover, the spring-catch permanently secured to said inner receptacle diametrically opposite the lug and located between said receptacles, so as to hold them together by frictional contact, the arm at the upper end of said catch formed by bending the same downwardly on an inclined line and then outwardly at a right angle, the construction being such that when the inner receptacle is forced down into the outer receptacle, the edge of the latter will engage with the upper portion of the spring-arm and lock the same, substantially as described.

In testimony that I claim the foregoing as my own I have hereunto affixed my signature in presence of two witnesses.

JOHN ELMGREN.

Witnesses:
 B. V. SWEENEY,
 E. B. KING.